Patented Aug. 30, 1949

2,480,109

UNITED STATES PATENT OFFICE 2,480,109

BENZANTHRONYLAMINO-THIOPHANTHRA-QUINONE COMPOUNDS

Clarence F. Belcher, Bridgeton, N. J., and Lorraine A. Mero, Wilmington, Del., assignors to E. I. du Pont de Nemours & Company, Wilmington, Del., a corporation of Delaware No Drawing. Application November 15, 1947, Serial No. 786,335

4 Claims. (Cl. 260—329)

This invention relates to the preparation of new compounds containing the thiophanthraquinone nucleus, which are particularly valuable as dye intermediates. The invention relates more particularly to the preparation of new compounds of the benzanthronyl-amino-thiophanthraquinone series which are represented by the general formula:

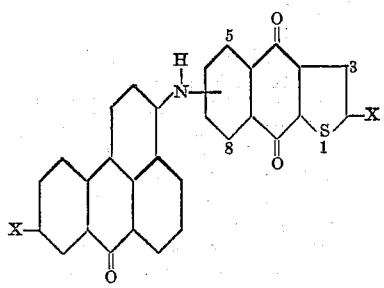

wherein the thiophanthraquinonyl radical is attached to the —N— in the 5- or 8-position and X in each case is hydrogen or halogen.

It is an object of this invention to provide new and valuable compounds particularly suitable for use as dye intermediates containing the thiophanthraquinone nucleus attached to the Bz-group of the benzanthrone molecule through an amino linkage.

The compounds of the benzanthronylamino-thiophanthraquinone series of this invention may be prepared by condensing one mol of a 5- or 8-aminothiophanthraquinone with a mono- or dihalogen benzanthrone (preferably the bromobenzanthrone) by the condensation methods ordinarily used in condensing aminoanthraquinone with halogen anthraquinone. As an alternative method, the 5- or 8-halogen thiophanthraquinone may be condensed with a Bz-1-aminobenzanthrone. Condensation may be carried out under a wide variety of conditions as to temperature and time, depending upon the reactants to be used. A temperature range of 180°–215° C. usually gives most satisfactory results, although temperatures outside of this range may occasionally be employed. The time of the reaction depends upon the temperature chosen and the particular reactants. The condensations are preferably carried out in inert organic solvents such as aromatic hydrocarbons, and chlorinated or nitrated aromatic hydrocarbons. Condensation is effected by any of the usual methods employing acid binding agents such as inorganic or organic bases and catalysts such as copper salts.

The following examples are given to illustrate the invention. The parts used are by weight, unless otherwise specified.

Example 1

A mixture of 128 parts of dry nitrobenzene, 16 parts of Bz-1-bromobenzanthrone, 12 parts of 5-amino-thiophanthraquinone, 6 parts of soda ash and 0.27 part of cuprous chloride are heated at 200°–205° C. for eight hours. The charge is filtered at 100° C., and the cake is reslurried in nitrobenzene at 140°–145° C. The violet-brown needle-like product is filtered off at 100° C., washed with hot nitrobenzene, alcohol, water and dried. The resulting 5-[Bz-1-benzanthronylamino]-thiophanthraquinone may be represented by the formula:

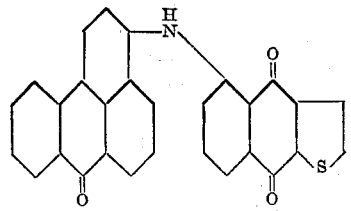

Example 2

A mixture of 148 parts of nitrobenzene, 18.5 parts of 6,Bz-1-dibromobenzanthrone, 11 parts of 5-aminothiophanthraquinone, 6.5 parts of soda ash and 0.48 part of cuprous chloride is heated at 185°±5° C. for eight hours. The charge is filtered at 80° C. and the cake is washed with nitrobenzene and reslurried in nitrobenzene at 140°–145° C. The violet-brown needle-like product, which is 5-[6-bromo-Bz-1-benzanthronylamino]-thiophanthraquinone, is filtered at 80° C., washed with nitrobenzene, alcohol and water, and dried. It may be represented by the formula:

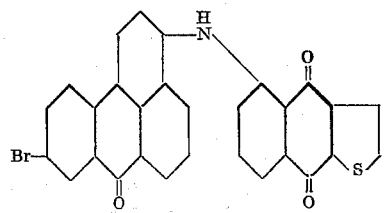

Example 3

A mixture of 90 parts of nitrobenzene, 10.7 parts of Bz-1-bromobenzanthrone, 8 parts of 8-aminothiophanthraquinone, 4.4 parts of soda ash and 0.2 part of cuprous chloride is heated at 200°–205° C. for eight hours. The charge is filtered at 100° C., and the cake is reslurried in nitrobenzene at 140°–145° C. The brownish crystalline, 8-[Bz-1-benzanthronylamino]-thiophanthraquinone, is filtered off at 100° C., washed with nitrobenzene, alcohol, water and dried. It may be represented by the formula:

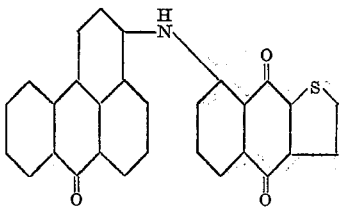

In place of the bromo-benzanthrone employed in the above examples, the Bz-1-chlorobenzanthrone or the 6,Bz-1-dichlorobenzanthrone may be employed. Where the dichloro compound is employed, the resulting chlorine-containing condensation product will be obtained. In a similar manner, the 2-chloro-5-aminothiophanthraquinone or the 2-chloro-8-aminothiophanthraquinone may be employed, in which case the resulting condensation product contains chlorine in the 2-position of the thiophanthraquinone radical.

The halogen-containing benzanthronylaminothiophantraquinones may be prepared in the manner illustrated in the above examples. As illustrations may be mentioned the condensation products of 2-chloro-5-aminothiophanthraquinone or 2-bromo-5-aminothiophanthraquinone with Bz-1-bromobenzanthrone or Bz-1-chlorobenzanthrone; one mol of 8-aminothiophanthraquinone with one mol of 6,Bz-1-dibromobenzanthrone or 6,Bz-1-dichlorobenzanthrone; 2-chloro-5-aminothiophanthraquinone or 2-bromo-5-aminothiophanthraquinone with 6,Bz-1-dibromobenzanthrone or 6,Bz-1-dichlorobenzanthrone; 2-chloro-8-aminothiophanthraquinone or 2-bromo-8-aminothiophanthraquinone with 6,Bz-1-dibromobenzanthrone, or 6,Bz-1-dichlorobenzanthrone.

The aminothiophanthraquinones employed in the above examples, and their preparation, are more particularly described in the co-pending application of Lee & Weinmayr Serial No. 723,672 filed January 22, 1947.

These new compounds of the benzanthronyl-aminothiophanthraquinone series by treatment with alcoholic caustic alkalies give valuable new dyes which show a very marked and unexpected depth in shade and improved light fastness over analogous anthraquinonylamino - benzanthrone compounds, as illustrated in co-pending application Serial No. 786,336 filed November 15, 1947, now Patent 2,480,110.

The 2-halogen-5-aminothiophanthraquinones employed as the starting materials in the preparation of the new compounds of this invention may be produced by the following process:

113 parts of 2-carbomethoxy-3-nitrobenzoic acid, 115 parts of phosphorous pentachloride and 250 parts of dry benzene are mixed (rather carefully). The mixture is heated to 65° C. for 10 minutes to form the acid chloride, then cooled to 10° C., and 143 parts of anhydrous stannic chloride are slowly added, followed by a mixture of 89 parts of 2-chloro-thiophene in 250 parts of benzene. The mixture is then stirred at 10°–15° C. for two hours and carefully poured into a mixture of 250 parts of ice water and 50 parts of concentrated hydrochloric acid. The benzene is removed by steam distillation, and the resulting aqueous suspension is cooled and filtered. The filter cake is slurried in a mixture of 500 parts of water, 500 parts of 95% alcohol and 200 parts of 30% sodium hydroxide solution for 18 hours to saponify the methyl ester. The resulting slurry is diluted with 3000 parts of water, filtered, acidified with hydrochloric acid and dried.

94 parts of the above product are dissolved in 683 parts of water containing 60 parts of 30% sodium hydroxide, at room temperature. This solution is added to a mixture of 583 parts of water, 147 parts of iron powder and 63 parts of $FeSO_4 \cdot 7H_2O$ during the course of 40 minutes at 95° C. The mixture is agitated for 10 minutes at 95° C., then 35 grams of sodium carbonate are slowly dusted in while cooling to 80° C. The hot solution is filtered, the filter cake washed with sufficient hot (90° C.) water to yield a clear filtrate; the combined filtrates are run slowly into a cold (10° C.) solution of 28.6 parts of 96% sulfuric acid in 415 parts of water. The resulting slurry is stirred for 90 minutes at 10°–15° C., filtered cold, washed with ice water and dried.

The resulting product is then cyclized to the 5-amino-2-chlorothiophanthraquinone by the following procedure:

73 parts of the above amino acid are slowly added to a mixture of 770 parts of 96% sulfuric acid and 150 parts of boric acid at 125°–130° C. The reaction mixture is held at this temperature for 15 minutes; cooled to 60° C., and at that temperature carefully diluted with 3000 parts of water to precipitate the 5-amino-2-chlorothiophanthraquinone. The reaction mixture is cooled to room temperature, filtered and washed acid-free. The resulting wet filter cake is slurried in 2000 parts of water containing 100 parts of sodium carbonate for 15 minutes at 60°–70° C. It is then filtered, washed alkali-free and dried. The product is recrystallized from 10 parts of orthodichlorobenzene to yield the substantially pure 5-amino-2-chlorothiophanthraquinone melting at 222°–223° C.

The 5-amino-2-bromo-thiophanthraquinone may be made in the same manner, starting with the 2-bromothiophene.

We claim:

1. The benzanthronylamino-thiophanthraquinones of the formula:

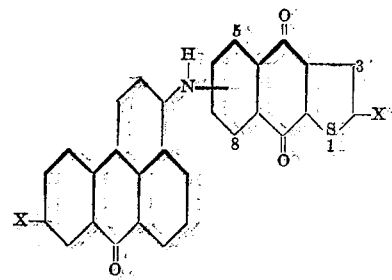

wherein the thiophanthraquinonyl radical is attached to the radical

in one of the positions 5 and 8, and X in each case is an atom of the group consisting of hydrogen and halogen.

2. The benzanthronylamino-thiophanthraquinone of the formula:
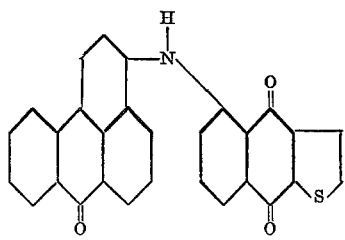
3. The benzanthronylamino-thiophanthraquinone of the formula:
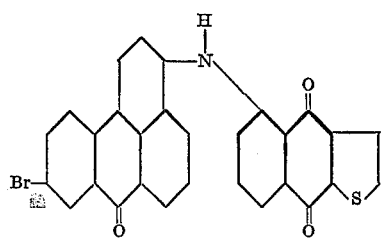
4. The benzanthronylamino-thiophanthraquinone of the formula:
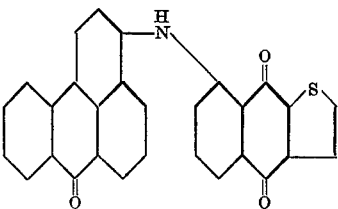
CLARENCE F. BELCHER.
LORRAINE A. MERO.
REFERENCES CITED
The following references are of record in the file of this patent:
UNITED STATES PATENTS
| Number | Name | Date |
|---|---|---|
| 2,212,029 | Lulek | Aug. 20, 1940 |